Oct. 29, 1968  R. MAURER  3,407,657
METERS FOR MEASURING THE MASS FLOW OF FLUID
Filed March 7, 1966  3 Sheets-Sheet 1

INVENTOR
ROBERT MAURER
BY
Bacon & Thomas
ATTORNEYS

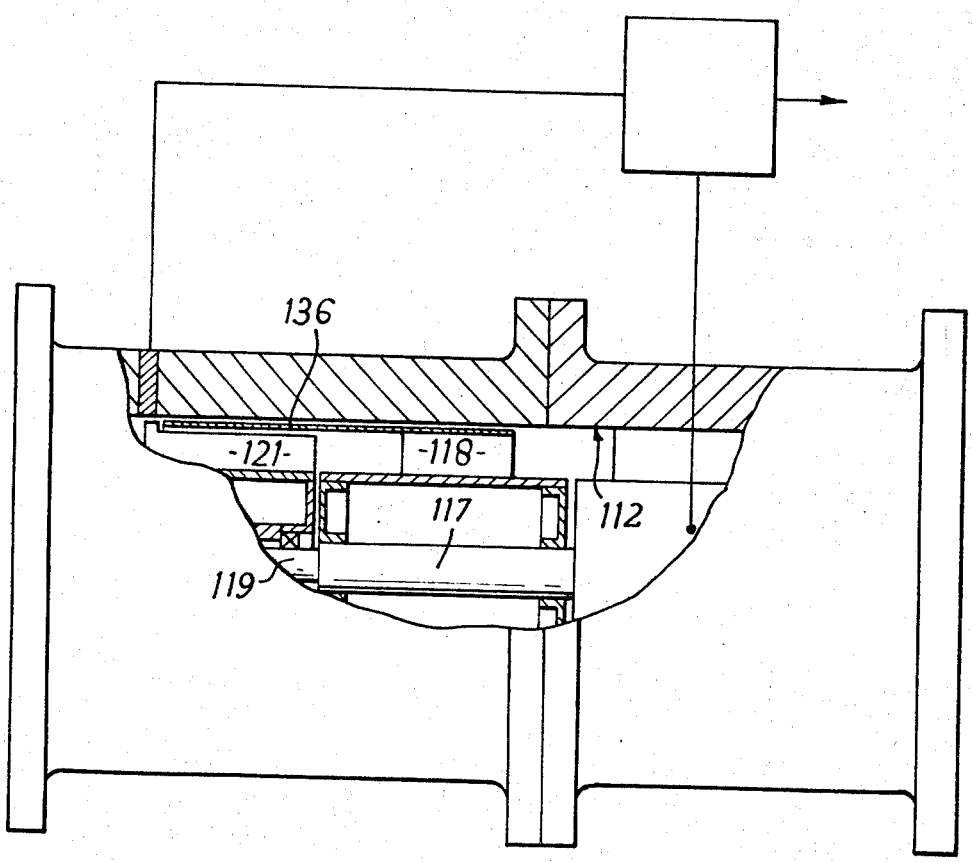

United States Patent Office 3,407,657
Patented Oct. 29, 1968

3,407,657
METERS FOR MEASURING THE MASS FLOW OF FLUID
Robert Maurer, 69 Torbay Road, Rayners Lane, Harrow, Middlesex, England
Filed Mar. 7, 1966, Ser. No. 532,449
Claims priority, application Great Britain, Mar. 6, 1965, 9,607/65
13 Claims. (Cl. 73—203)

ABSTRACT OF THE DISCLOSURE

A mass flowmeter through which a fluid stream flows has angled vanes to impart swirl to the fluid and the reaction on the vanes is transmitted to a torque meter. The swirling fluid drives a speed wheel that measures the swirl velocity. A shroud around the speed wheel is connected to the torque meter, through the angled vanes and serves to transmit a force to the torque meter to compensate for viscous drag on the speed wheel.

---

Figure 1:
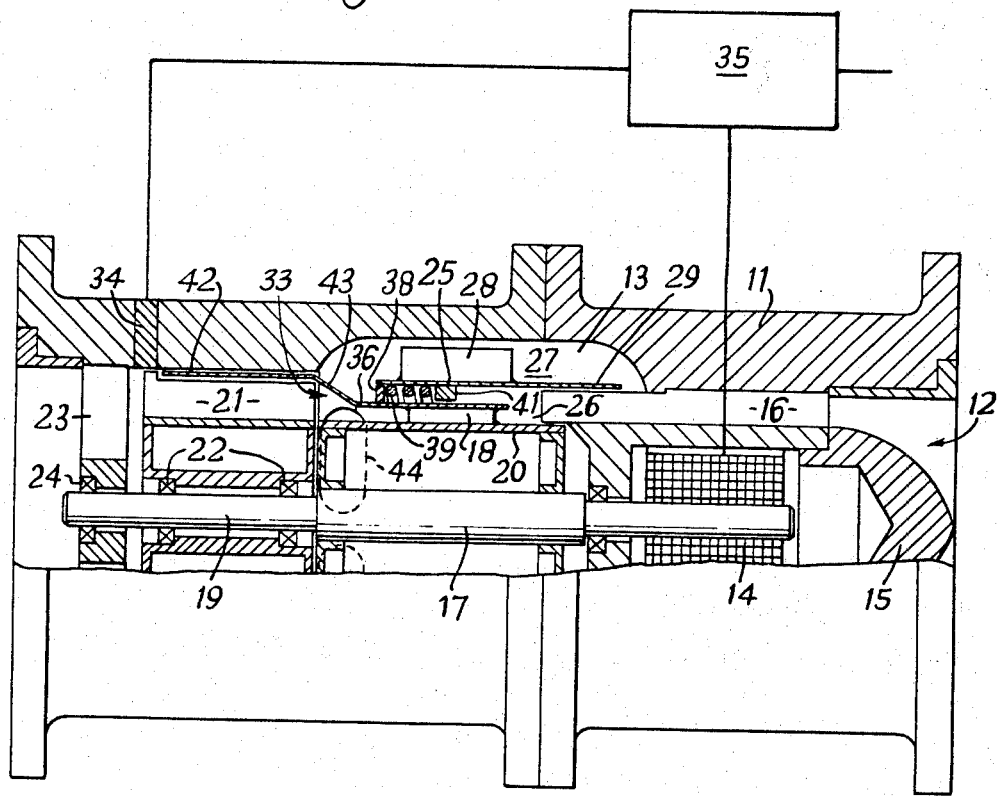

This invention is concerned with apparatus for use in such a meter comprising inclined guide vanes for imparting a swirl to fluid, measuring means for measuring the torsional reaction of the fluid on the guide vanes and a speed paddle or the like for determining the swirl velocity of the fluid. Such apparatus is hereinafter referred to as apparatus as specified.

According to this invention there is provided apparatus as specified further comprising a shroud for the speed paddle, which shroud is connected to the said measuring means. Thus any retardation of the velocity of the speed paddle by viscous drag between the ends of the blades of the speed paddle and the shroud will be compensated for by the reverse torsional reaction on the measuring means.

The speed paddle is preferably mounted on bearings on a shaft extending from the measuring means. Thus any bearing friction between the speed paddle and the shaft, which will also retard the speed paddle velocity, will also subtract from the momentum measured by the measuring means.

The shroud is preferably mounted on the outer ends of the inclined guide blades. This apparatus finds particular application where there is a by-pass for by-passing the inclined guide vanes and a mixing chamber upstream of the speed paddle, into which mixing chamber the by-pass and inclined guide vanes both discharge and openings are provided in the shroud through which fluid passing from the by-pass may flow into the mixing chamber.

Four embodiments of the invention will now be described, by way of example, with reference to the accompanying drawings.

Figure 2:
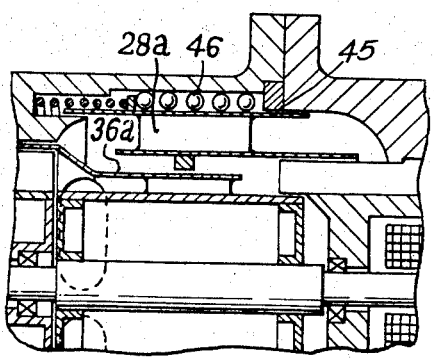
Figure 3:
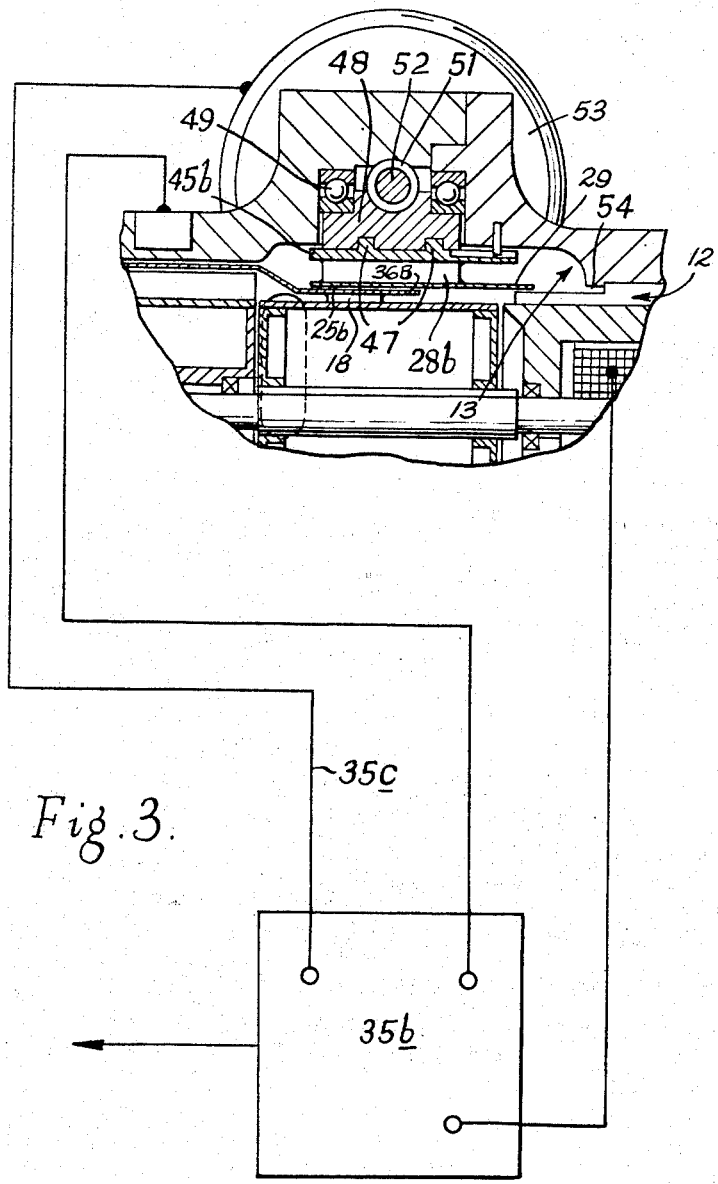

In the drawings:

FIGURE 1 is a view partially in longitudinal section of a meter of the invention, FIGURES 2 and 3 are detail views of two modifications, and FIG. 4 is a view similar to FIG. 1 showing a further meter embodying the invention.

Referring now to FIGURE 1, the meter there shown is very similar to the meter of FIGURE 1 of my co-pending application Ser. No. 368,135, filed May 18, 1964, now Patent No. 3,308,662. This meter comprises a body portion 11 having therethrough a bore 12 with an enlarged central portion 13. A torque meter 14 is provided in a faired housing 15 at the inlet end of the bore 12. Axial guide vanes 16 extend between the housing 15 and wall of the bore 12. The torque meter has a shaft 17 carrying at the portion 13 a hollow drum 20 on which are mounted inclined guide vanes 18. Downstream of the inclined guide vanes 18 the shaft 17 has a reduced portion 19. A speed paddle 21 is mounted on the portion 19 of the shaft 17 by bearings 22. The free end of the shaft 17 is mounted in bearings 24 carried by axially directed outlet vanes 23. At the portion 13 the bore 12 is divided into inner and outer chambers 26 and 27 by a sleeve 25 carrying axial guide vanes 28 in the outer chamber 27 and a shroud 36 carried by the inclined guide vanes 18. The sleeve 25 has a forward extension 29 which controls the inlet to the outer or by-pass chamber 27. The shroud 36 has an upstanding lip 38 against which one end of a spring 39 abuts. The other end of the spring 39 butts against an internal lip 41 on the sleeve 25 to urge the sleeve extension 29 to seal off the outer or by-pass chamber 27.

A shroud 42 is provided for the speed paddle 21, being slightly spaced therefrom. This shroud 42 is formed as an extension of the inclined guide vane shroud 36, being connected thereto by a conical portion 43. Enlarged openings 44 are provided in the conical portion 43. The space within this conical portion 43 forms a mixing chamber 33 in which the liquid discharged from the inclined guide vanes 18 and the outer or by-pass chamber 27 can mix with a minimum of momentum losses.

A computer or other calculating device 35 is connected to the torque meter 14 and the speed paddle pick-off 34 and gives a signal corresponding to mass flow through the meter based on the signals from the torque meter 14 and the pick-off 34.

In use fluid flows through the meter and at low flow rates the portion 29 closes off the outer or by-pass chamber 27. The fluid in chamber 26 has a swirl imparted to it by the vanes 18. The reaction of the fluid on the vanes 18 is measured by the torque meter 14 the force being transmitted thereto by the drum 20 and shaft 17. The velocity of the swirl is measured by the speed paddle 21. It will be noted that the speed paddle 21 rotates in a direction opposite to the direction in which the vanes 18 are urged by fluid flow. Thus if there is any bearing friction which tends to slow down the speed paddle this will exert a compensatory force on the shaft 17. Also, if there is any viscous drag between the ends of the speed paddle 21 and the shroud 42 which tends to slow down the speed paddle 21, there will be a compensatory force on the torque meter 14 via the shroud 36, the inclined vanes 18, drum 20 and shaft 17.

When the flow increases the effect of the momentum of the fluid acting on the lip 41 will cause the extension or valve 29 to open allowing some of the fluid to flow through chamber 27 by-passing the vanes 18. This fluid will rejoin the fluid passing through the inclined vane chamber 26 in the mixing chamber 33 after having passed through the openings 44. The swirl velocity of the total flow will now be measured by the speed paddle 21.

Under all circumstances the compensatory effects mentioned above will operate.

Reference is now made to FIGURE 2. In this embodiment the axial guide vanes 28a are mounted at their outer ends on a sleeve 45 which runs along a path defined by ball bearings 46 in a race in the meter body. At their inner ends the axial guide vanes are mounted on the sleeve 25. In this embodiment the inclined guide vane shroud 36a does not have a lip 38 as in the first described embodiment.

In the embodiment of FIGURE 3 the axial guide vanes 28b are mounted at their inner ends on sleeve 25b and at their outer ends on a sleeve 45b which has two peripheral cam tracks 47 formed thereon. These tracks 47 are received in internal cam grooves in a worm wheel 48 mounted in bearings 49 in the central portion 13 of the bore 12. Thus, as the wheel 48 is rotated the sleeve 45 is moved axially to open or close the valve 29. This worm wheel 48 is driven by a worm 51 mounted on the shaft 52 of a motor 53. This motor 53 is controlled by an output 35c of a modified computer 35b to open or to close the valve 29. In this embodiment the sleeve 25b closely surrounds the shroud 36b of the inclined guide vanes 18.

The bore 12 has a recess 54 at the commencement of the enlarged portion 13. The forward end of the sleeve extension 29 is housed within this recess so that on initial movement of the sleeve extension 29 no fluid will enter the by-pass. This modification is preferably also incorporated in the first two described embodiments to allow for the initial spring responses which do not always conform to the desired characteristics.

In the modification shown in FIGURE 4 the bypass is omitted, the bore 112 being straight throughout the meter. Here the speed paddle 121 is again mounted on the extension 119 of the torque meter shaft 117. The inclined guide vanes 118 now extend to the same height as the speed paddle vanes. A cylindrical shroud 136 is carried by the inclined guide vanes 118 and extend over the tips of the speed paddle vanes. This meter operates and compensates similarly to the above-described meters save that, having no bypass chamber, the range of the meter of FIGURE 4 will be small by comparison to the range of the meters of FIGURES 1 to 3.

The meter may be adapted to measure the mass flow of liquids or gases.

I claim:

1. Apparatus for measuring the mass flow of a stream of fluid therethrough, comprising:
   (a) means defining a first fluid flow path,
   (b) restrained inclined guide vanes in the first fluid flow path for imparting a swirl to the fluid,
   (c) measuring means, having input means to which said guide vanes are drivingly connected, for measuring the torsional reaction of the fluid on the inclined guide vanes,
   (d) a rotatable speed paddle for measuring the swirl velocity of the fluid and having output means for providing a signal indicative of said swirl velocity, and
   (e) a shroud encompassing the speed paddle and relative to which the speed paddle may rotate, the said shroud being drivingly connected to said input of said measuring means.

2. Apparatus as claimed in claim 1, wherein the speed paddle is mounted on bearings on a shaft extending from the measuring means.

3. Apparatus as claimed in claim 1, wherein the shroud is mounted on the outer ends of the inclined guide vanes.

4. Apparatus as claimed in claim 1, in which there is a by-pass for by-passing the inclined guide vanes and a mixing chamber upstream of the speed paddle, into which mixing chamber the by-pass and inclined guide vanes both discharge, and wherein openings are provided in the shroud through which fluid passing from the by-pass may flow into the mixing chamber.

5. Apparatus as claimed in claim 1 in which the speed paddle shroud has a cylindrical continuation fixedly connected to the inclined guide vanes and serving as a shroud for the said inclined guide vanes.

6. Apparatus as claimed in claim 5 further comprising:
   (a) means defining a second fluid flow path surrounding the said first fluid flow path,
   (b) means for directing a portion of said stream through the second fluid flow path to bypass the said first fluid flow path,
   (c) a mixing chamber within the said shroud between said guide vanes and said speed paddle, and
   (d) apertures in the said shroud through which fluid from the second fluid flow path may pass to enter the mixing chamber.

7. Apparatus as claimed in claim 6 in which the said cylindrical continuation is of smaller diameter than the shroud and is connected thereto by a converging conical portion.

8. Apparatus as claimed in claim 7 in which the said apertures are formed in the said conical portion.

9. Apparatus as claimed in claim 1 further comprising calculator means connected to the said measuring means and the output of said speed paddle to receive signals therefrom and programmed to give an output signal dependent upon the mass flow of the stream of fluid through the said apparatus.

10. Apparatus as claimed in claim 9 wherein the calculator means comprises a computer.

11. Apparatus as claimed in claim 6, further comprising valve control means for controlling fluid flow through the said second fluid flow path, means for moving the said valve control means, and calculator means connected to the said measuring means and the said speed paddle to receive signals therefrom and programmed to give an output signal dependent upon the mass flow of the stream of fluid through the said apparatus, which said calculator means is connected to said means for moving the valve control means to control the operation thereof.

12. A meter for measuring the mass flow of a stream of fluid therethrough, comprising:
   (a) means directing a portion of said stream along a first path,
   (b) means for imparting a swirl to the fluid in said first path,
   (c) means directing the remainder of said stream along a second path bypassing the said first path,
   (d) means defining a mixing chamber, said first and second paths discharging into said mixing chamber,
   (e) an outlet leading from said mixing chamber,
   (f) a speed paddle adjacent to said outlet for measuring the total swirl velocity of the entire fluid stream entering said outlet and having output means providing a signal indicative of said swirl velocity,
   (g) means having an input for measuring the torsional reaction of said fluid,
   (h) computer means connected to said measuring means and the output of said speed paddle to receive signals therefrom and programmed to give output signals dependent upon the mass flow of the stream of fluid through the said apparatus,
   (i) variable valve means for regulating the proportions of said streams directed into said first and second paths,
   (j) an electric motor connected to the computer means and being controlled by one of the said output signals,
   (k) a worm wheel surrounding the said variable valve means and being formed with cam·means, and
   (l) cam follower means operatively connected to the said variable valve means, which said cam follower means engages the cam means on the worm and is restrained against rotational movement so that on rotation of the worm the cam follower means and with it the variable valve means are moved axially to regulate the proportions of said stream directed into said first and second paths.

13. A meter as claimed in claim 12 wherein said means for measuring the torsional reaction of said fluid is responsive to the torisonal forces acting on said means for imparting swirl to said fluid, the meter further comprising a shroud for the speed paddle and relative to which the speed paddle may rotate, the said shroud being drivingly connected to the input to the means for measuring the torsional reaction of said swirling fluid.

References Cited

UNITED STATES PATENTS

| | | | |
|---|---|---|---|
| 2,293,478 | 8/1942 | Stevenson | 73—203 |
| 3,164,017 | 1/1965 | Karlby et al. | 73—231 |
| 3,276,258 | 10/1966 | Rowley | 73—194 |
| 3,308,662 | 3/1967 | Maurer | 73—203 X |
| 893,873 | 4/1962 | Great Britain. | |

RICHARD C. QUEISSER, *Primary Examiner.*

EDWARD D. GILHOOLY, *Assistant Examiner.*